United States Patent
Lee et al.

(10) Patent No.: US 10,177,567 B2
(45) Date of Patent: Jan. 8, 2019

(54) POWER SUPPLY APPARATUS AND ELECTRONIC APPARATUS HAVING THE SAME

(71) Applicant: SAMSUNG ELECTRONICS CO., LTD., Suwon-si (KR)

(72) Inventors: Jae-cheol Lee, Yongin-si (KR);
Byung-soo Kim, Seoul (KR);
Jae-hwan Kim, Suwon-si (KR);
Kee-yeong Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 503 days.

(21) Appl. No.: 14/242,134

(22) Filed: Apr. 1, 2014

(65) Prior Publication Data
US 2014/0354060 A1    Dec. 4, 2014

(30) Foreign Application Priority Data

Jun. 3, 2013 (KR) .......................... 10-2013-0063747

(51) Int. Cl.
*H02J 1/00* (2006.01)
*H02J 7/34* (2006.01)

(52) U.S. Cl.
CPC ................... *H02J 1/00* (2013.01); *H02J 7/34* (2013.01); *Y10T 307/653* (2015.04)

(58) Field of Classification Search
CPC ............ H02J 1/00; H02J 7/34; Y10T 307/653
USPC .......... 307/43, 49, 54, 57, 63, 71, 76, 78, 80
See application file for complete search history.

(56) References Cited

U.S. PATENT DOCUMENTS

| 4,175,249 | A | * | 11/1979 | Gruber ...................... G05F 1/67 |
| | | | | 136/293 |
| 6,268,711 | B1 | | 7/2001 | Bearfield |
| 6,424,875 | B1 | * | 7/2002 | Yoon ...................... H03G 3/348 |
| | | | | 345/211 |
| 7,667,434 | B2 | | 2/2010 | Nollet |
| 2002/0113493 | A1 | | 8/2002 | Morrow |
| 2003/0071523 | A1 | * | 4/2003 | Silverman ............... H01M 2/20 |
| | | | | 307/150 |

(Continued)

FOREIGN PATENT DOCUMENTS

| EP | 1 087 495 A2 | 3/2001 |
| EP | 1 801 948 A1 | 6/2007 |
| WO | 02/060029 A1 | 8/2002 |

OTHER PUBLICATIONS

Communication dated Nov. 21, 2014 issued by the European Patent Office in counterpart European Patent Application No. 14152403.3.

*Primary Examiner* — Daniel Kessie
(74) *Attorney, Agent, or Firm* — Sughrue Mion, PLLC

(57) ABSTRACT

A power supply apparatus and an electronic apparatus are provided. The power supply apparatus includes: a plurality of power supplies arranged as a single array; a switch disposed between the plurality of power supplies configured to control connection states of the plurality of power supplies; and a controller configured to control the switch to connect the plurality of power supplies in parallel when a first event requiring a voltage less than a predetermined reference voltage occurs, and configured control the switch to connect the plurality of power supplies in series when a second event requiring a voltage exceeding the predetermined reference voltage occurs.

4 Claims, 8 Drawing Sheets

(56) References Cited

U.S. PATENT DOCUMENTS

| | | | |
|---|---|---|---|
| 2004/0155627 A1 | 8/2004 | Stanesti et al. | |
| 2007/0152634 A1 | 7/2007 | Nollet | |
| 2009/0079412 A1* | 3/2009 | Kuo | H01L 31/02008 323/299 |
| 2010/0289447 A1 | 11/2010 | Dobson et al. | |
| 2011/0018352 A1* | 1/2011 | Lai | H02J 7/0024 307/80 |
| 2011/0241431 A1* | 10/2011 | Chen | H02J 3/383 307/71 |
| 2012/0013180 A1* | 1/2012 | Muto | B60L 11/1855 307/9.1 |
| 2013/0002021 A1* | 1/2013 | Watanabe | H02M 7/483 307/43 |
| 2013/0033112 A1* | 2/2013 | Thompson | H01L 31/02021 307/71 |
| 2014/0001865 A1* | 1/2014 | Osterloh | H01L 31/02021 307/77 |

* cited by examiner

POWER SUPPLY APPARATUS AND ELECTRONIC APPARATUS HAVING THE SAME

CROSS-REFERENCE TO RELATED APPLICATION

This application claims priority from Korean Patent Application No. 10-2013-0063747, filed on Jun. 3, 2013 in the Korean Intellectual Property Office, the disclosure of which is incorporated herein by reference in its entirety.

BACKGROUND

1. Field

Apparatuses and methods consistent with exemplary embodiments relate to a power supply apparatus and an electronic apparatus having the same. More particularly, apparatuses consistent with the exemplary embodiments relate to a power supply apparatus which supplies various power levels from a plurality of power supply sources by means of a switch, and an electronic apparatus having the same.

2. Description of the Related Art

A battery management system (BMS) refers to a system that prevents overcharging or over discharging of a battery by monitoring the battery. A battery is, for example, a power supply source in an electronic apparatus. A BMS also increases energy efficiency and battery life by balancing voltages between battery cells.

FIG. 1 is a block diagram of a power supply apparatus in a related-art battery management system. Referring to FIG. 1, the related-art power supply apparatus 1 includes a power supply 10, a first converter 20, and a second converter 30. A power supply can be, for example, a device which provides electric power. The first converter 20 and the second converter 30 may be connected to a first element 50 and a second element 60, respectively. The first and second element could be, for example, a pre-amplifier and an amplifier, respectively. The power supply 10 may be implemented by using a single battery or a plurality of batteries. When the power supply 10 is implemented by using a plurality of batteries, the batteries are connected to one another in series or in parallel so that power is supplied to both the first converter 20 and the second converter 30. The first converter 20 and the second converter 30 each may raise or reduce power which is supplied to drive the first element 40 and the second element 60 appropriately. That is, since the power supplied by the power supply 10 has a fixed value, the first converter 20 and the second converter should adjust the fixed level of power supplied from the power supply 10, in order to drive the first element 50 and the second element 60 which are operated by different optimal levels of power.

However, when the converter changes the power level, energy is lost based on the change in power level which can result in reduced efficiency. Also, since a separate converter is required, the cost increases. There is also a limit in its ability to supply an optimal level of power to each element.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a power supply apparatus which supplies power of varying levels by connecting a plurality of power supplies in series or in parallel by using a switch, and an electronic apparatus having the same.

According to an aspect of an exemplary embodiment, there is provided a power supply apparatus including: a plurality of power supplies arranged as a single array; a switch disposed between the plurality of power supplies configured to control connection states of the plurality of power supplies; and a controller configured to control the switch to connect the plurality of power supplies in parallel when a first event requiring a voltage less than a predetermined reference voltage occurs, and configured to control the switch to connect the plurality of power supplies in series when a second event requiring a voltage exceeding the predetermined reference voltage occurs.

In an aspect of an exemplary embodiment, voltages of the plurality of power supplies may be the same.

The controller may control the switch to connect an anode of a first power supply of the plurality of power supplies and an anode of a second power supply of the plurality of power supplies, and controls the switch to connect a cathode of the first power supply and a cathode of the second power supply, such that the plurality of power supplies are connected to each other in parallel.

The controller may control the switch to connect an anode of a first power supply of the plurality of power supplies and a cathode of a second power supply of the plurality of power supplies such that the plurality of power supplies are connected to each other in series.

The power supply apparatus may include a plurality of power supply arrays, and an output terminal of a first power supply array of the plurality of power supply arrays may be connected to an input terminal of a second power supply array which is adjacent to the first power supply array.

According to an aspect of another exemplary embodiment, there is provided an electronic apparatus which is operable in a first mode and a second mode, the electronic apparatus including: a first element configured to be operated by a voltage less than a predetermined reference voltage in the first mode and the second mode; a second element configured to be operated by a voltage less than the predetermined reference voltage in the first mode, and configured to be operated by a voltage exceeding the predetermined reference voltage in the second mode; and a power supply apparatus configured to supply power to the first element and the second element, wherein the power supply apparatus includes: a plurality of power supplies arranged as a single array; a switch disposed between the plurality of power supplies and configured to control connection states of the plurality of power supplies; and a controller configured to control the switch to connect the plurality of power supplies in parallel when the electronic apparatus is operated in the first mode, and configured to connect the plurality of power supplies in series when the electronic apparatus is operated in the second mode.

In an aspect of an exemplary embodiment, voltages of the plurality of power supplies may be the same.

The electronic apparatus may further include a direct current to direct current (DC-to-DC) converter connected between the first element and one of the plurality of power supplies, and the DC-to-DC converter may reduce a voltage supplied to the first element when the electronic apparatus is operated in the second mode and thus the plurality of power supplies may be connected to one another in series.

The power supply apparatus may include a plurality of power supply arrays including the plurality of power supplies and the switch, and an output terminal of a first power supply of the plurality of power supply arrays may be connected to an input terminal of a second power supply array of the plurality of power supply arrays which is adjacent to the first power supply array.

The electronic apparatus may be implemented by using an audio apparatus, and the first element may be implemented by using a pre-amplifier and the second element may be implemented by using an amplifier. The first mode may be a mode in which an audio signal is output which is less than a predetermined level, and the second mode may be a mode in which an audio signal is output which exceeds the predetermined level.

According to the various exemplary embodiments described above, the power supply apparatus supplies power of varying levels from the plurality of power supplies.

BRIEF DESCRIPTION OF THE DRAWINGS

The above and/or other aspects will be more apparent by describing in detail exemplary embodiments, with reference to the accompanying drawings, in which.

DETAILED DESCRIPTION OF EXEMPLARY EMBODIMENTS

Figure 1:
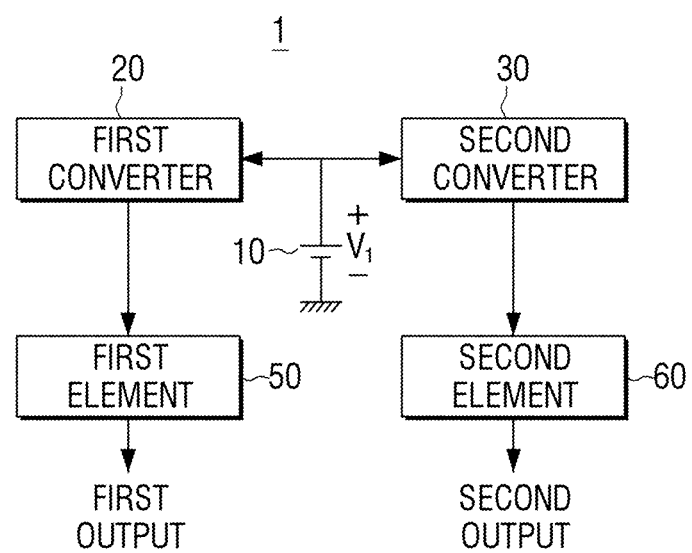
FIG. 1 is a block diagram illustrating a power supply apparatus in a related art battery management system.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
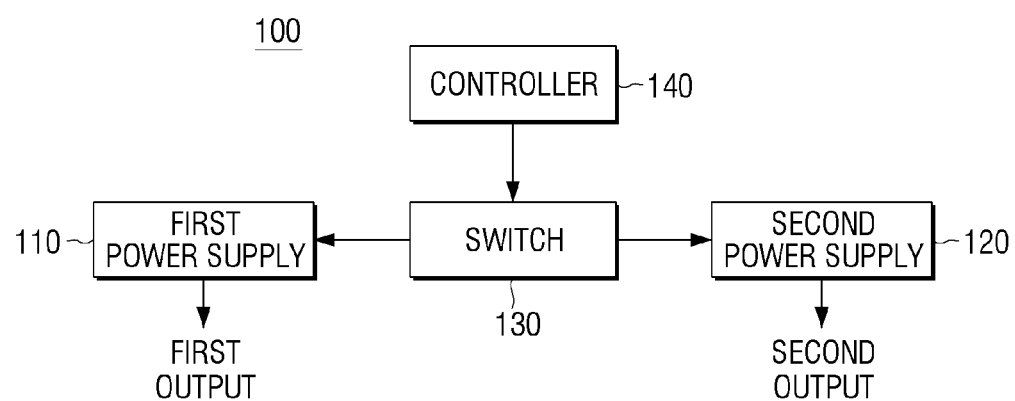
FIG. 2 is a block diagram of a power supply apparatus according to an exemplary embodiment.

FIG. 2 is a block diagram illustrating a power supply apparatus 100 according to an exemplary embodiment.

Referring to FIG. 2, a power supply apparatus 100 according to an exemplary embodiment includes a first power supply 110 and a second power supply 120, a switch 130, and a controller 140. In the exemplary embodiment, two power supplies are illustrated, however, the exemplary embodiment is not limited to two power supplies.

The power supplies supply power to elements connected thereto. In this case, the supplied power may be direct current power or alternating current power. The power supplied to the elements may be supplied from the plurality of power supplies and each power supply may have an output terminal formed therein. The elements may include, for example, a pre-amplifier and an amplifier.

The first output may be supplied to an element that is connected to the first power supply 110 through the output terminal formed in the first power supply 110, and the second output may be supplied to an element that is connected to the second power supply 120 through the output terminal formed in the second power supply 120. Although only the first power supply 110 and the second power supply 120 are illustrated, this is merely an example and the exemplary embodiment is not limited to the two power supplies. Accordingly, the power supply of the power supply apparatus 100 according to another exemplary embodiment may include a plurality of power supplies other than two. In this case, the plurality of power supplies may be arranged as a single array.

The switch 130 is disposed between the plurality of power supplies to control connection states of the plurality of power supplies. As shown in FIG. 2, the switch 130 may be connected between the first power supply 110 and the second power supply 120. A level of power supplied by the first power supply 110 or the second power supply 120 may be changed by switching the switch 130.

The controller 140 may be connected to the switch 130 and may receive an external signal. In this case, the external signal may be a signal that contains information on an optimal level of power that is required by an element which is connected to the power supply. Accordingly, a signal that contains information on an optimal level of power that is supplied by each of the plurality of power supplies may be input to the controller 140, and the controller 140 may control switching of the switch 130 according to the input signal such that the optimal level of power is supplied to each element.

In this case, the controller 140 may control switching of the switch 130 to connect the plurality of power supplies in series or in parallel. That is, when a first event that requires a voltage less than a predetermined reference voltage occurs, the controller 140 may control the switch 130 to connect the plurality of power supplies in parallel, and when a second event that requires a voltage exceeding the predetermined reference voltage occurs, the controller 140 may control the switch 130 to connect the plurality of power supplies in series. The voltages of the plurality of power supplies may be the same. The predetermined reference voltage can be determined based on the device using the power supply. Accordingly, when the first event that requires the voltage less than the predetermined reference voltage occurs, the controller 140 controls the switch 130 to connect an anode of one of the plurality of power supplies and an anode of another power supply, and controls the switch 130 to connect a cathode of one of the plurality of power supplies and a cathode of another power supply, such that the plurality of power supplies are connected to one another in parallel.

Also, when the second event that requires a voltage exceeding the predetermined reference voltage occurs, the controller 140 controls the switch 130 to connect an anode of one of the plurality of power supplies and a cathode of another power supply, such that the plurality of power supplies are connected to one another in series.

The plurality of power supplies may supply the same level of voltage and the voltage level may be pre-set. That is, the first power supply 110 and the second power supply 120 may supply a predetermined reference voltage to elements connected thereto, and each element may be driven by the predetermined reference voltage. Therefore, the first event refers to a case in which the elements connected to the first power supply 110 and the second power supply 120 may be driven by the predetermined reference voltage or a voltage less than the predetermined reference voltage. Therefore, when the first event occurs, the element connected to the first power supply 110 and the element connected to the second power supply 120 may be driven by the first output and the second output having the same voltage level. In this case, the first power supply 110 and the second power supply 120 may be connected to each other in parallel.

However, the element connected to the second power supply 120 may require a high output based on a given situation. In this case, it is necessary to raise the second output and supply it to the element. That is, the element connected to the first power supply 110 may be driven by the predetermined reference voltage, but the element connected to the second power supply 120 requires a voltage which is higher than the predetermined reference voltage. Accordingly, the second event may refer to a case in which one or more of the plurality of power supplies requires a voltage exceeding the predetermined reference voltage. Therefore, when the second event occurs, the element connected to the first power supply 110 may be driven by the predetermined reference voltage, and the element connected to the second power supply 120 may be driven by a voltage level that is a sum of the voltage level of the first power supply 110 and the voltage level of the second power supply 120. In this case, the switch 130 may be switched to connect the first power supply 110 and the second power supply 120 in series.

Figure 3:
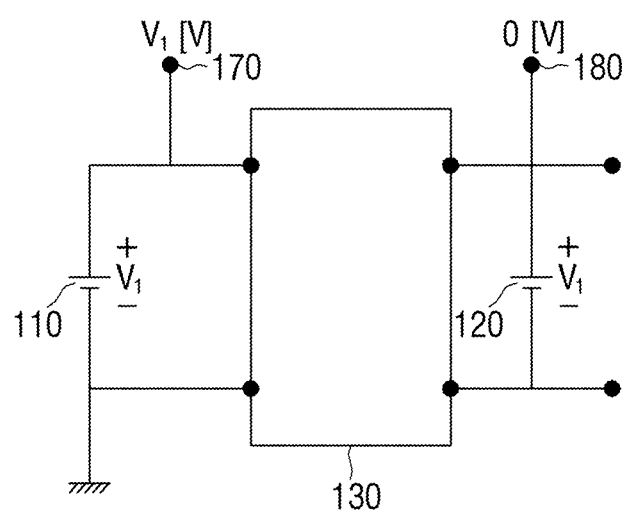
FIGS. 3 to 5 are views illustrating examples of a power supply apparatus according to an exemplary embodiment.
Figure 4:
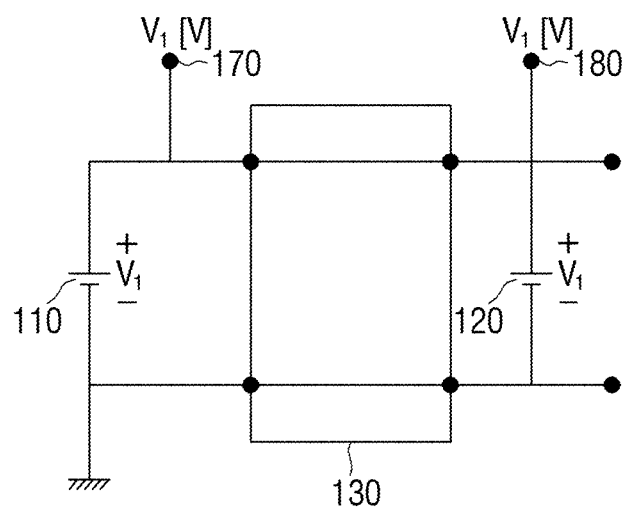
Figure 5:
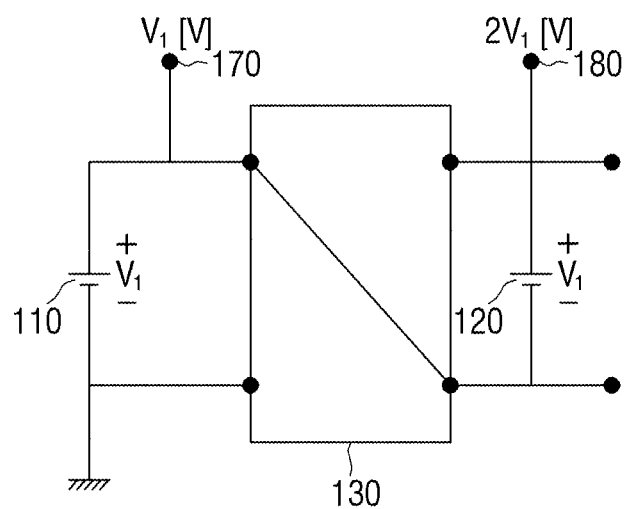

FIGS. 3 to 5 are views illustrating examples of a power supply apparatus 100 according to an exemplary embodiment.

Referring to FIGS. 3 to 5, the first power supply 110 and the second power supply 120 have a voltage $V_1[V]$ having the same level. The switch 130 may be connected between the first power supply 110 and the second power supply 120.

FIG. 3 illustrates a case in which only an element connected to a first output terminal 170 is driven and an element connected to a second output terminal 180 is not driven. As shown in FIG. 3, the first power supply 110 and the second power supply 120 may be open-circuited by the switch 130. Since the first power supply 110 is grounded and the second power supply 120 is not grounded, the voltage level of the first output terminal 170 formed in the first power supply 110 is $V_1[V]$, and the voltage level of the second output terminal 180 formed in the second power supply 120 is 0[V]. Accordingly, in order to drive only the element connected to the first output terminal 170 without driving the element connected to the second output terminal 180, the first power supply 110 and the second power supply 120 may be open-circuited by the switch 130.

FIG. 4 illustrates a case in which the element connected to the first output terminal 170 and the element connected to the second output terminal 180 are driven by a reference voltage having a same level. As shown in FIG. 4, the switch 130 is switched to connect an anode of the first power supply 110 and an anode of the second power supply 120, and is switched to connect a cathode of the first power supply 110 and a cathode of the second power supply 120, such that the first power supply 110 and the second power supply 120 are connected to each other in parallel. Since the first power supply 110 and the second power supply 120 are connected to one another in parallel by the switch 130, the voltage level of the first output terminal 170 and the voltage level of the second output terminal 180 are $V_1[V]$. Accordingly, in order to drive the element connected to the first output terminal 170 and the element connected to the second output terminal 180 at a same level reference voltage, the first power supply 110 and the second power supply 120 may be connected to each other by the switch 130.

FIG. 5 illustrates a case in which the element connected to the first output terminal 170 is driven by a predetermined reference voltage and the element connected to the second output terminal 180 is driven by a voltage exceeding the predetermined reference voltage. As shown in FIG. 5, the switch 130 is switched to connect the anode of the first power supply 110 and the cathode of the second power supply 120, such that the first power supply 110 and the second power supply 120 are connected to each other in series. Since the first power supply 110 and the second power supply 120 are connected to each other in series by the switch 130, the voltage level of the first output terminal 170 is $V_1[V]$ and the voltage level of the second output terminal 180 is $2V_1[V]$. Accordingly, in order to drive the element connected to the first output terminal 170 by the predetermined reference voltage and in order to drive the element connected to the second output terminal 180 by a voltage exceeding the predetermined reference voltage, the first power supply 110 and the second power supply 120 may be connected to each other in series by the switch 130.

Figure 6:
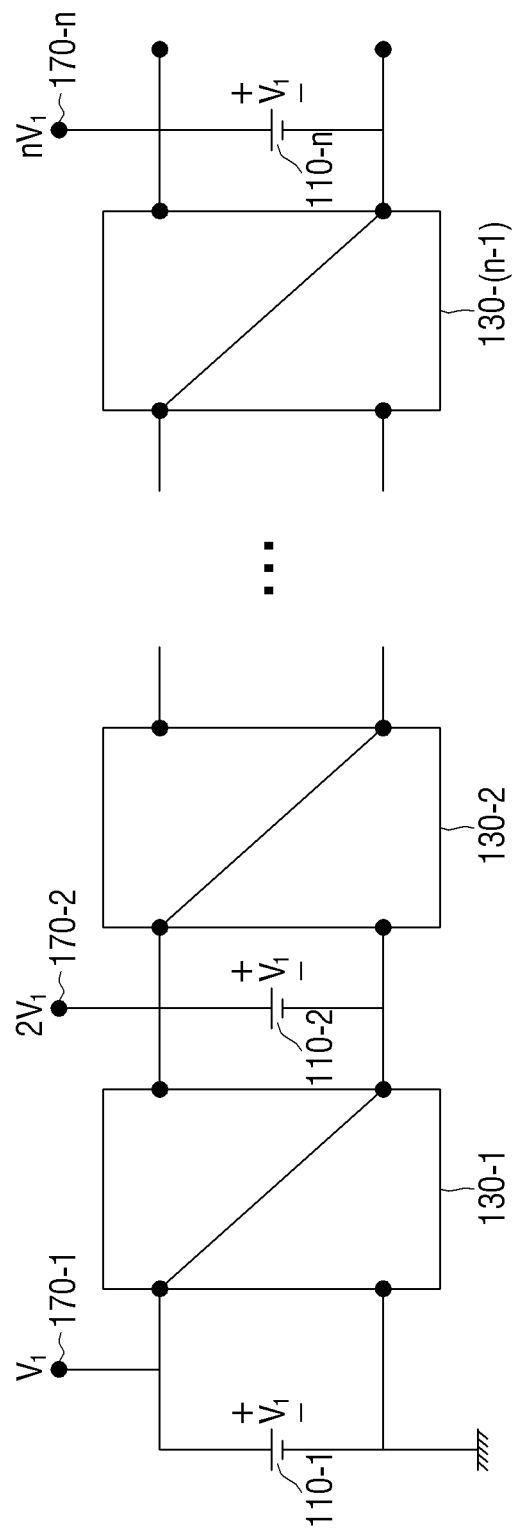
FIG. 6 is a view illustrating an example of a power supply apparatus according to another exemplary embodiment.

FIG. 6 is a view illustrating an example of a power supply apparatus according to another exemplary embodiment. Hereinafter, redundant explanations will be omitted.

Referring to FIG. 6, the power supply apparatus according to another exemplary embodiment includes a plurality of power supplies and a plurality of switches. In FIG. 6, power supplies 110-1, 110-2, ~, 110-n, and switches 130-1, 130-2, ~, 130-(n−1) are shown. That is, the power supply apparatus according to another exemplary embodiment may be formed of a single array by connecting the plurality of power supplies 110-1, 110-2, ~, 110-n and the plurality of switches 130-1, 130-2, ~, 130-(n−1). The plurality of power supplies 110-1, 110-2, ~, 110-n may output the same voltage level $V_1[V]$. Since a switch is disposed between two power supplies, (n) number of power supplies and (n−1) number of switches are illustrated in FIG. 6. Also, each of the plurality of power supplies 110-1, 110-2, ~, 110-n may include a single output terminal and at least one element may be connected to each of a plurality of output terminals 170-1, 170-2, ~, 170-n.

When the first event occurs, the plurality of switches 130-1, 130-2, ~, 130-(n−1) may be switched so as to connect the plurality of power supplies 110-1, 110-2, ~, 110-n in parallel. Accordingly, the plurality of power supplies 110-1, 110-2, ~, 110-n may supply the same voltage level $V_1[V]$ to the elements connected thereto.

Also, when the second event occurs, the plurality of switches 130-1, 130-2, ~, 130-(n−1) may be switched to connect the plurality of power supplies 110-1, 110-2, ~, 110-n in series. Accordingly, as shown in FIG. 6, the voltage of the first output terminal 170-1 may be $V_1[V]$, the voltage of the second output terminal 170-2 may be $2V_1[V]$, and the voltage of the nth output terminal 170-n may be $n*V_1[V]$.

Depending on the situation, the driving voltage required by each element may not be an integer multiple of the predetermined reference voltage. In this case, the plurality of power supplies 110-1, 110-2, ~, 110-n may not output the same voltage level. That is, the first power supply, the second power supply, and the nth power supply may supply voltages of $V_1[V]$, $V_2[V]$, $V_n[V]$ In this case, even when the first event occurs, the plurality of switches 130-1, 130-2, ~, 130-(n−1) do not switch to connect the plurality of power supplies 110-1, 110-2, ~, 110-n in parallel. That is, when the first event occurs, each of the plurality of power supplies may be grounded and the switches may be switched to short-circuit the plurality of power supplies 110-1, 110-2, ~, 110-n. Accordingly, the voltage of the first output terminal 170-1 may be $V_1[V]$, the voltage of the second output terminal 170-2 may be $V_2[V]$, and the voltage of the nth output terminal 170-n may be $V_n[V]$.

Also, when the second event occurs, the plurality of switches 130-1, 130-2, ~, 130-(n−1) are switched to connect the plurality of power supplies 110-1, 110-2, ~, 110-n in series. Accordingly, the voltage of the first output terminal 170-1 may be $V_1[V]$, the voltage of the second output terminal 170-2 may be $(V_1+V_2)[V]$, and the voltage of the nth output terminal 170-n may be $(V_1+V_2+\sim+V_n)[V]$.

Figure 7:
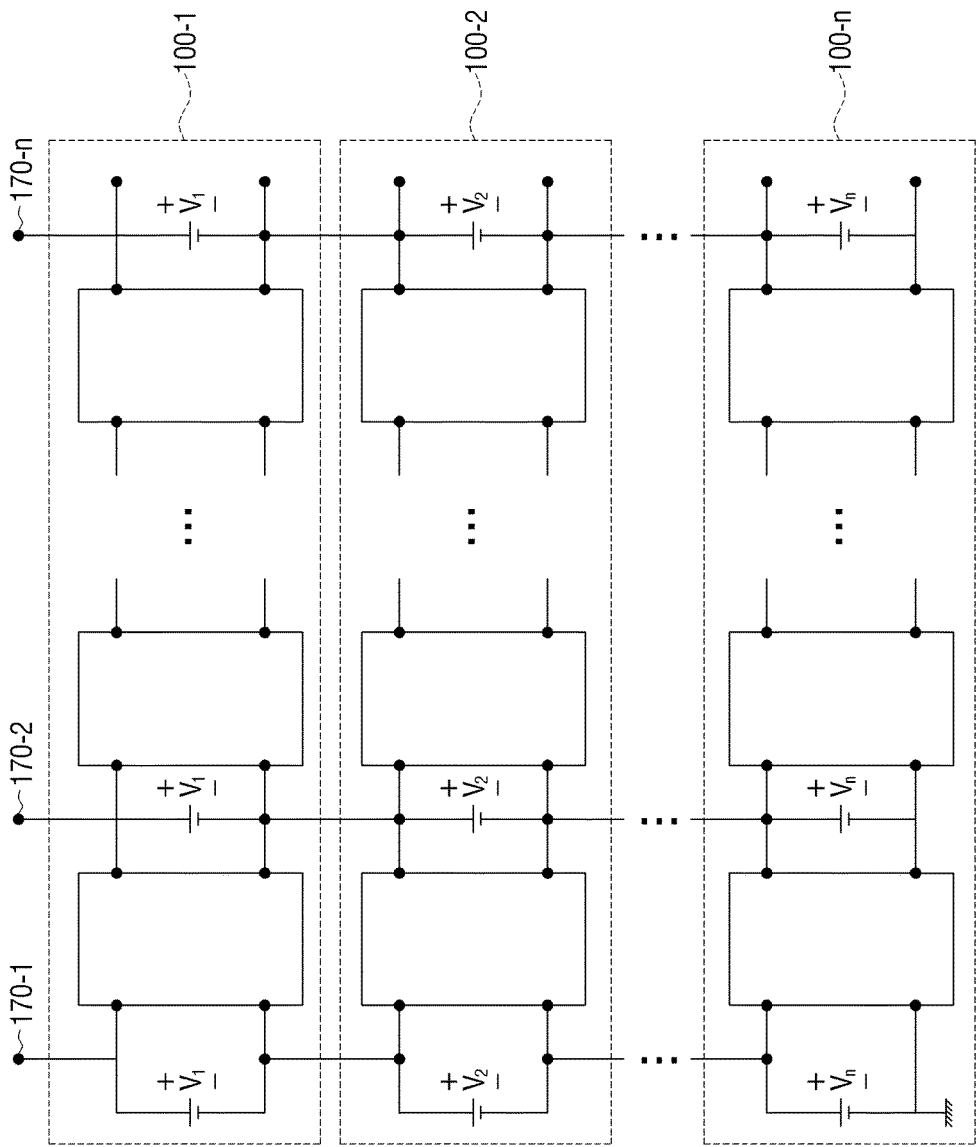
FIG. 7 is a view illustrating an example of a power supply apparatus according to still another exemplary embodiment.

FIG. 7 illustrates a power supply apparatus formed with a plurality of arrays which is an example of a power supply apparatus according to still another exemplary embodiment. Referring to FIG. 7, the power supply apparatus according to still another exemplary embodiment includes a plurality of power supply arrays 100-1, 100-2, ~, 100-n. When the plurality of power supply arrays 100-1, 100-2, ~, 100-n are electrically connected to one another, an output terminal of one of the plurality of power supply arrays 100-1, 100-2, ~, 100-n may be connected to an input terminal of adjacent power supply array. Also, when each of the plurality of power supply arrays 100-1, 100-2, ~, 100-n is electrically short-circuited, each of the plurality of power supply arrays 100-1, 100-2, ~, 100-n may form a plurality of output terminals. In this case, elements, such as an amplifier, may be connected to the plurality of output terminals. A single power supply array is the same as that described in FIG. 6 and thus a redundant explanation is omitted.

When the plurality of switches are switched to short-circuit all of the power supplies or are switched to connect all of the power supplies in parallel, the plurality of power supply arrays 100-1, 100-2, ~, 100-n may be electrically connected to one another. However, when the plurality of switches are switched to connect all of the power supplies in series, the plurality of power supply arrays 100-1, 100-2, ~, 100-n may be electrically short-circuited. Also, when the plurality of switches included in a single power supply array are switched to connect all of the power supplies in series, and the plurality of switches included in an another power supply array, which is adjacent to the single power supply array, is switched to connect all of the power supplies in parallel, the plurality of power supply arrays 100-1, 100-2, ~, 100-n may be electrically short-circuited.

Figure 8:
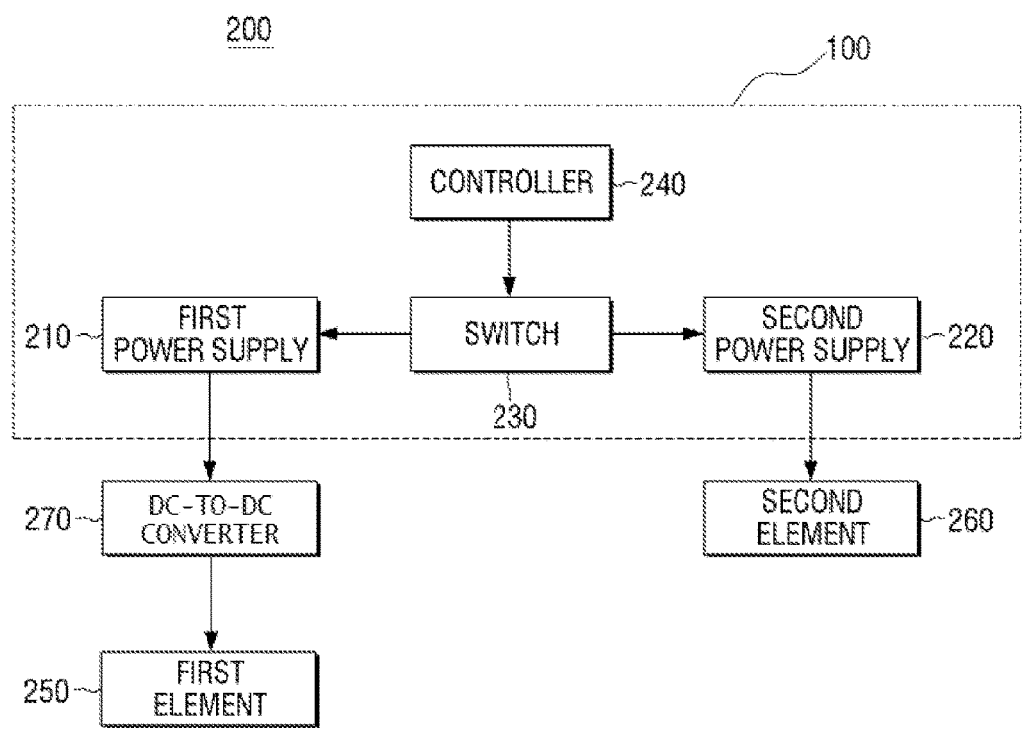
FIG. 8 is a view illustrating an example of an electronic apparatus according to an exemplary embodiment.

FIG. 8 is a view illustrating an example of an electronic apparatus 200 according to an exemplary embodiment.

Referring to FIG. 8, an electronic apparatus 200 according to an exemplary embodiment includes a first element 250, a second element 260, and a power supply apparatus 100.

The power supply apparatus 100 includes a plurality of power supplies, such as a first power supply 210 and a second power supply 220, a switch 230, and a controller 240. The power supply apparatus has been described above and thus a redundant explanation is omitted.

The power supply apparatus 100 supplies power to the first element 250 and the second element 260. In this case, a plurality of power supply apparatuses may be provided. Also, a plurality of power supply apparatuses may be formed and may be arranged as a single array.

The first element 250 may be an element that is operated by a voltage less than a predetermined reference voltage in a first mode and a second mode. Also, the second element 260 may be an element that is operated by a voltage less than the predetermined reference voltage in the first mode, and is operated by a voltage exceeding the predetermined reference voltage in the second mode. In this case, the first mode may refer to a state in which low output is required for the second element 260 and the second mode may refer to a state in which high output is required for the second element 260. Accordingly, when a low output or a high output is required for the second element 260, the first element 250 may be operated by a voltage less than the predetermined reference voltage. Also, when a low output is required for the second element 260, the second element 260 may be operated by a voltage less than the predetermined reference voltage, and, when a high output is required for the second element 260, the second element 260 may be operated by a voltage exceeding the predetermined reference voltage.

The electronic apparatus 200 according to an exemplary embodiment may be an audio playback apparatus. In this case, the first element 250 may be a pre-amplifier and the second element 260 may be an amplifier. The amplifier amplifies a signal that is output from the pre-amplifier and the pre-amplifier adjusts an input signal minutely and outputs the signal to the amplifier. Accordingly, the amplifier may be operated by only low output and also may be operated by high output. Commonly, the pre-amplifier does not require a high output. The pre-amplifier and the amplifier are well known in the related art thus an explanation thereof is omitted.

As shown in FIG. 8, the first element 250 may receive power from a first power supply 210, and the second element 260 may receive power from a second power supply 220. In this case, the voltage level of the first power supply 210 and the second power supply 220 may be the same. Since the first element 250 does not require a high output, it may receive power from the first power supply 210 and may be driven. That is, in the first mode or second mode, the first element 250 may receive power from the first power supply 210. The second element 260 may require a low output or a high output when being driven. That is, in the first mode, the second element 260 may receive power from the second power supply 220. However, in the second mode, the second element 260 cannot be driven only by the power supplied from the second power supply 220. Accordingly, the switch 230 is switched to connect the first power supply 210 and the second power supply in series such that the second element 260 may receive power which is a sum of power from the first power supply 210 and power from the second power supply 220.

On the other hand, the switch 230 may be switched to connect the first power supply 210 and the second power supply 220 in parallel. When the voltage level of the first power supply 210 is the same as that of the second power supply 220, the first element 250 and the second element 260 may receive power of the same voltage level.

The voltage level of the first and second power supplies 210 and 220 may be appropriate for driving the second element 260, but may be excessive for driving the first element 250. In this case, optionally a first direct current to direct current (DC-to-DC) converter 270 may be connected between the first power supply 210 and the first element 250. Accordingly, the first DC-to-DC converter 270 may reduce the voltage level of the power supplied by the first power supply 210 and then may supply the power to the first element 250.

The voltage level of the first power supply 210 and the second power supply 220 may be appropriate for driving the first element 250, but may be insufficient for driving the second element 260. In this case, a second DC-to-DC converter (not shown) may be connected between the second power supply 220 and the second element 260. Accordingly, the second DC-to-DC converter (not shown) may raise the voltage level of the power supplied by the second power supply 220 and then may supply the power to the second element 260.

The power supply apparatus may include a plurality of power supply arrays including a plurality of power supplies and a plurality of switches 230, and an output terminal of one of the plurality of power supply arrays may be connected to an input terminal of an adjacent power supply array. An explanation of this is the same as described above and is therefore omitted.

The foregoing exemplary embodiments are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic apparatus which is operable in at least one of a first mode and a second mode, the electronic apparatus comprising:
   a first device configured to be operated by a voltage less than or equal to a predetermined reference voltage in the first mode and in the second mode;
   a second device configured to be operated by a voltage less than or equal to the predetermined reference voltage in the first mode, and configured to be operated by a voltage exceeding the predetermined reference voltage in the second mode; and
   a power supply apparatus configured to supply power to the first device and the second device,
   wherein the power supply apparatus comprises:
      a plurality of power supplies arranged as a single array, the plurality of power supplies comprising a first power supply with a first output terminal and a second power supply with a second output terminal, wherein the plurality of power supplies are configured to supply power to the first device through the first output terminal and to the second device, which is different from the first device, through the second output terminal;
      a plurality of switches disposed between the plurality of power supplies; and
      a controller configured to control the plurality of switches to:
         connect the first power supply and the second power supply in parallel to each other in order to output a first voltage through the first output terminal and the second output terminal, if the electronic apparatus operates in the first mode, and
         connect the first power supply and the second power supply in series to simultaneously output the first voltage to the first device through the first output terminal and a second voltage greater than the first voltage to the second device through the second output terminal, if the electronic apparatus operates in the second mode,
   wherein the electronic apparatus is implemented using an audio apparatus, the first device is implemented using a pre-amplifier, and the second device is implemented by using an amplifier, and
   wherein the amplifier is configured to output a first audio signal which is less than or equal to a predetermined level in the first mode, and output a second audio signal which exceeds the predetermined level in the second mode.

2. The electronic apparatus as claimed in claim 1, wherein voltages of the plurality of power supplies are the same.

3. The electronic apparatus as claimed in claim 1, further comprising a direct current to direct current (DC-to-DC) converter connected between the first device and one of the plurality of power supplies,
   wherein the DC-to-DC converter is configured to reduce a voltage supplied to the first device when the electronic apparatus is operated in the second mode and the plurality of power supplies are connected to each another in a series.

4. The electronic apparatus as claimed in claim 1, wherein the power supply apparatus comprises a plurality of power supply arrays comprising the plurality of power supplies and the plurality of switches, and
   wherein an output terminal of a first power supply array of the plurality of power supply arrays is connected to an input terminal of a second power supply array of the plurality of power supply arrays which is adjacent to the first power supply array.

* * * * *